Dec. 22, 1959  B. K. JAQUITH  2,917,926
MEANS FOR EXTRACTING TRUE PROPORTIONATE
SAMPLES OF FLUID MATERIAL
Filed Oct. 28, 1957
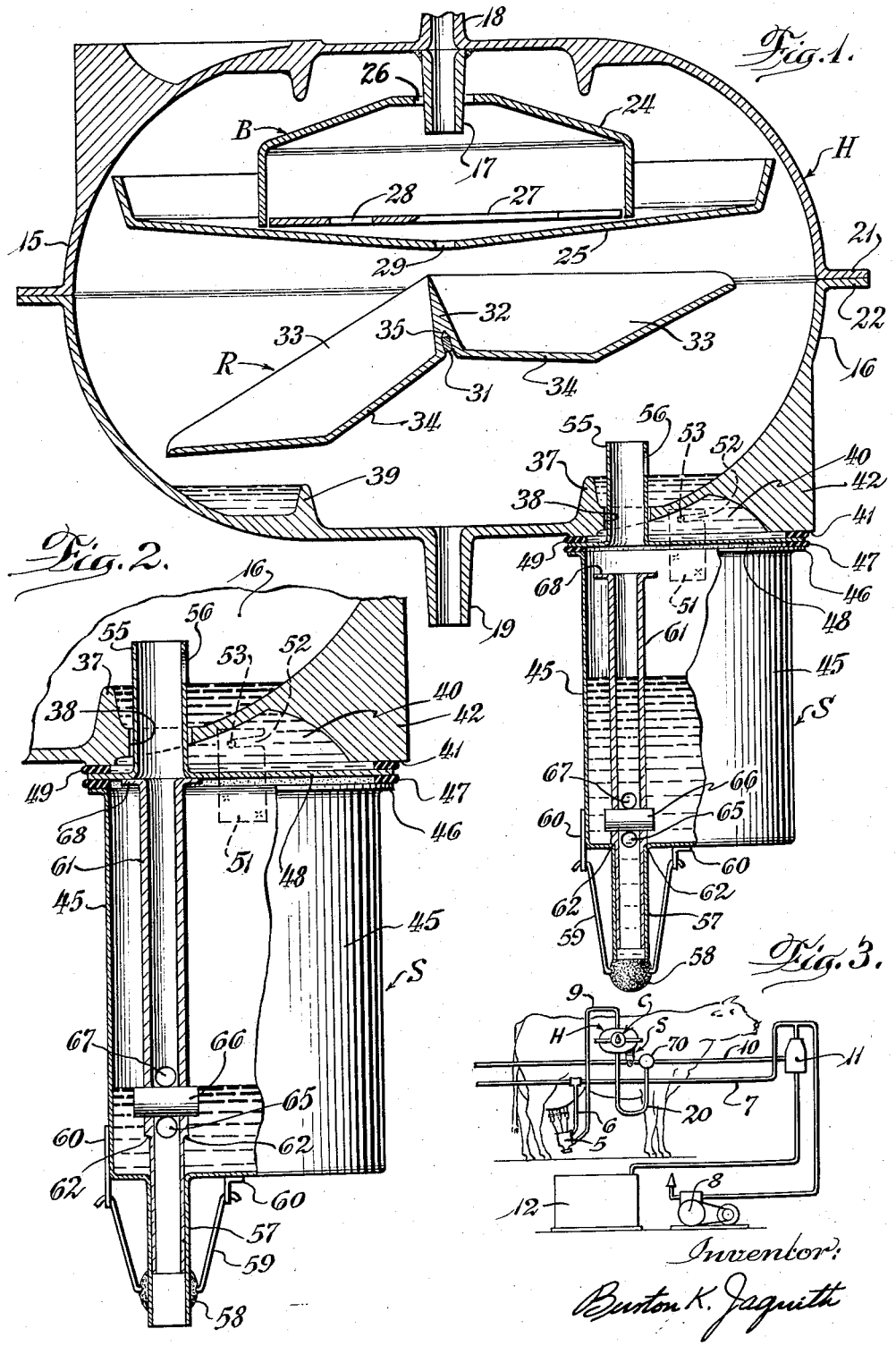
Inventor:
Burton K. Jaquith

United States Patent Office 2,917,926
Patented Dec. 22, 1959

2,917,926

MEANS FOR EXTRACTING TRUE PROPORTIONATE SAMPLES OF FLUID MATERIAL

Burton K. Jaquith, Fort Lauderdale, Fla.

Application October 28, 1957, Serial No. 692,730

10 Claims. (Cl. 73—422)

This invention relates to means for extracting and accumulating samples of fluid material of variable content passing through a conduit. As a primary objective, I aim to take from the fluid material, while en route within a conduit, many samples at regularly spaced intervals, then accumulate all such samples within a collecting chamber, then subject the fluid material so accumulated to agitation whereby to assure a uniform constituency throughout its entire body, and then return to the conduit all of the fluid material so accumulated in excess of that needed for test. In this way the small amount of fluid material thus extracted for test is a truly proportionate sample and an accurate reflection of the entire body of fluid material passed through the conduit.

It frequently happens that a run of fluid material varies considerably in its constituency so that one or more samples taken at random are not truly representative; the test results of such samples are accordingly of little value. One such example is the milk yield of a cow which varies widely in butter fat content between the beginning and end of a milking operation. By the present invention I am able to attain a very high degree of accuracy in obtaining for test a truly proportionate sample of milk, and do this by interposing the sampler mechanism in the milking machine line extending from the cow to the tank where the milk is to be stored and refrigerated. There is no delay or interruption in the milking operation due to the presence of the sampler mechanism. At the conclusion of the milking period the test sample is immediately available upon opening of a valve which controls return to the line of milk in excess of that required for testing and release of the latter for laboratory use.

In the ensuing description, my invention will be discussed in connection with a conventional milking machine conduit system where a condition of minus pressure is maintained. Many objects and purposes served by the present mechanism, and a clear understanding thereof, will be unfolded as the description proceeds along with reference to the accompanying drawing which illustrates, as a specific example, a sampler mechanism designed for and applied to a typical milk conduit system starting with the claw at the udder of a cow and ending with a tank wherein the milk is accumulated. In the drawing wherein similar reference characters are applied to like parts shown in the several figures:

Figure 1 is a central vertical section of a housing containing means for converting the continuous flow of milk through a closed conduit system into one that is intermittent preliminary to delivery of extracted samples of the milk into the present sampler mechanism that is attached to the housing and depended therefrom, a small portion of one element within the housing being shown in elevation; Fig. 2 is a vertical section, partly in elevation, of the sampler mechanism per se, the vent tube therein being shown in its up position; and Fig. 3 is a diagrammatic view of a conventional milk conduit system wherein the present sampler mechanism is operatively interposed.

In Figure 3 there is illustrated a closed conduit system through which a pulsating fluid is drawn in response to operation of a vacuum pump. Such a system is more or less common with present day milking machines. It comprises a claw 5 having teat cups applicable to the udder of a cow and provided with a flexible connection 6 leading to the air line 7 and a vacuum pump 8; also a flexible connection 9 leading to a housing H which is interposed in the milk line 10 leading to a releaser 11 (for separating air from the milk) en route to the tank 12 wherein the accumulating milk is refrigerated and stored. Into and through such a conduit system which is closed and wherein a minus pressure is constantly maintained, the milk is drawn while pulsated in response to operation of the vacuum pump. To determine accurately the weight of the milk delivered at the source, i.e., the yield of the cow, while the milk is passing uninterruptedly to the storage tank, a suitable weighing mechanism is accommodated within the housing. While this mechanism forms no part of the present invention beyond the fact that it cooperates therewith in a very special manner, some description thereof will be in order so that a clear comprehension may be gained of the working of the sampler hereinafter to be described in detail.

The weighing mechanism enclosed within the housing H comprises two complementary elongated bowl-shaped shells, one upper 15 and one lower 16, defining between them a closed chamber through which the fluid material is continuously circulated while weighed. At the top of the upper shell 15 is an inlet in the form of a nipple extending both inwardly of the chamber at 17 and outwardly thereof at 18 to facilitate connection therewith of the flexible pipe 9 (see Fig. 3) leading to the conduit through which is flowed the fluid material to be weighed. An outlet nipple 19 provided at the bottom of the lower shell 16 may be joined as by a flexible connection 20 to the conduit line 10 to deliver the weighed material to the point of its discharge, such as the tank 12. Along their meeting edges the two shells are provided with outturned flanges 21 and 22 which interengage to form a fluid-tight joint therebetween. Suitable means (not shown) are employed to hold the two shells securely together.

The upper shell 15 accommodates within itself a baffle unit B which, as shown, comprises an open-bottom baffle box 24 whose depending walls rest upon a baffle drain pan 25. At its top center the baffle box is apertured at 26 where it loosely surrounds the depending nipple 17 in spaced relation thereto. A baffle plate 27 which is confined within the depending walls of the baffle box 24 and rested loosely upon the baffle drain pan 25 is formed with openings 28 through which fluid material may drain into the pan. The baffle drain pan 25 is itself elongated in general conformity with the contour of the housing shells, and its bottom is pitched from opposite ends downwardly to its low point in the center which takes the form of a transversely extending shallow gutter wherein a plurality of aligned drain openings 29 are provided. The baffle unit B into which the incoming fluid first enters serves as a receiving station wherein deaeration and depulsing of the material takes place. While halted at this station, the fluid body is quieted and relieved of any entrapped air whose presence would otherwise tend to prevent a smooth and even flow thereof. This is important in order that the scale mechanism may function accurately and speedily.

The fluid material upon leaving the baffle unit B descends through the drain openings 29 into a lower part of the housing chamber along a line which extends transversely thereof at the longitudinal center of the housing. The baffle unit B is removably supported in place as by the out-springing of its resilient side walls into engagement with ledges (not shown) on the inner faces of the upper shell 15. Each of the parts comprised in the baffle unit is desirably produced from a suitable plastic material and may be readily separated from the others for facile cleaning and sanitizing.

Within the lower shell 16 is a scale receiver R in the form of an elongated tray mounted at its center point upon a rocker shaft 31 extending transversely of the housing. For the major portion of its length, throughout its center portion, the shaft 31 is flatted but opposite end portions are rounded out for rotatable engagement within aligned, cylindrical bearings in the form of openings (not shown) which are formed in the walls of the lower shell 16. A partition wall 32 traversing the rocker tray R centrally thereof is joined to side and bottom walls 33 and 34, respectively, thereby to define two fluid-tight compartments of identical capacity. The base of the partition wall 32 is widened to accommodate for its length a slot 35 open along its bottom to rest upon the flatted portion of the shaft 31 with whose opposite faces it is engaged non-rotatably. The shaft-tray assembly is exactly balanced but with capacity for rocking movement between two fixed positions in either of which the bottom of the tray compartment which is down will be inclined downwardly to rapidly discharge through its open end the fluid load that has previously been deposited therein.

Fig. 1 illustrates the receiver R in discharge position for the compartment at its lower (left) end. While so positioned, the partition wall 32 is also inclined to the left so that its upper edge is disposed to the left of the drain openings 29 in the gutter of the baffle drain pan 25 thereabove; material flowing by gravity through these openings will accordingly be discharged into the tray upper compartment (to the right as shown in Fig. 2). Filling of this upper compartment starts after emptying of the lower compartment to the left has been well under way. All the fluid material in the lower (left) compartment will, therefore, have been discharged therefrom before any considerable filling of the upper (right) compartment has taken place. By providing drain openings 29 of an aggregate area requisite for proper regulation of the flow of material passing therethrough, a complete emptying of the discharging (down) compartment can be assured before a predetermined weight of the material can accumulate within the receiving (upper) compartment. By this means each filling of the upper compartment will proceed to the point of depositing therein material having a predetermined weight so that it is possible to ascertain, with the aid of an accumulating counter device C (see Fig. 3), the exact quantity of material, by weight, which has flowed through the gutter openings 29 to rock the receiver R through its successive cycles during the entire period of operation.

With continued discharge of material through the gutter openings 29, the two-compartment scale receiver R is repeatedly operated through its cycle to move between two positions in one of which the filled compartment is emptied and the other filled, and vice versa, but with very little time loss. The factors of speed and accuracy must be constantly reckoned with, and appropriate means (not shown) are provided to fix the time requisite for movement of the receiver R between its two positions. In practice, each movement of the receiver which is of a relatively short range starts off very fast and proceeds at an accelerating pace so that the fluid material entering the baffle means B of the housing is enabled to maintain a substantially continuous flow therefrom into and out of the receiver R and on through the conduit system, all without noticeable interruption or variation in its flow rate while undergoing a concurrent weighing operation.

A weighing mechanism through which the material is flowed uninterruptedly while advancing through a conduit system, and in which the flow characteristics are altered briefly by a rocker device of the kind just described, lends itself admirably to the association therewith of the present sampler which has for one of its main objectives the attainment of a very high degree of accuracy in obtaining test samples having true proportions of the material extracted.

While known mechanical samplers may be satisfactory for many fluid materials, none is sufficiently accurate in the case of milk to meet the exacting needs of the dairy industry. This is because the milk initially let down is lower in butter fat content that that in the final stripping of the milking operation; there is accordingly a constant variation in the constituency of the milk passing through the conduit system. It is possible, however, to incorporate with a weighing mechanism having a rocker device of the kind hereinbefore disclosed, when interposed in a milk line, a sampler mechanism S which will extract from each unit of milk being weighed a true proportionate sample, in a predetermined amount, such an extraction being known as an "aliquot solution." This mechanism and method for sampling will now be described at length.

The lower shell 16 of the housing H, according to Figs. 1 and 2, is provided in one end portion thereof with a weir 37 extending transversely across its bottom to define with the remaining walls a shallow well. An orifice 38 is formed at the low point of this well, and at a corresponding point in the opposite end portion of the shell 16 a second weir 39, similar to the first, is also provided. The orifice 38 opens out onto a circular chamber 40, eccentrically thereof, disposed upon the under side of the shell bottom and surrounded by a seat 41 formed by a wide depending circular wall 42.

The sampler mechanism S comprises a collecting chamber in the form of a deep cup 45 having at its top an outturned flange 46 in engagement with a gasket 47 which rests against the under face of a circular plate 48 forming a closure for the open top of the cup. A second gasket 49 overlies this plate 48 in position to rest against the seat 41 thereby completing a leak-tight connection between the cup 45 and the housing lower shell 16 from which the cup depends. A releasable supporting connection therebetween may be provided by a pair of ears 51 upstanding from the cup walls at diammetrically opposite points, each ear being formed with an inclined slot 52 arranged to engage the projecting end of a pin 53 which is anchored in the circular shell wall 42 surrounding the seat 41. By the provision of some such connecting means as the slots and pins just described, the cup, when fitted in position and turned a few degrees in the proper direction, will become locked tightly to the housing H, in a predetermined rotative position, so as to receive fluid draining therefrom through the orifice 38; when desired, the cup, upon being turned reversely, will unlock itself for ready disconnection from the housing H and for disassembly of the various parts associated therewith.

The closure plate 48 mounts eccentrically of itself and coaxially of the orifice 38, an upwardly extending orifice tube 55 of a size to freely pass through said orifice. Any small quantity of fluid material escaping through the orifice 38 along the outside of the tube 55 will be retained within the chamber 40 whose bottom is constituted by the removable closure plate 48 which is normally maintained in sealing engagement with its seat 41. This orifice which extends upwardly through the surrounding shallow well for a distance well beyond the weir 37 is provided in its walls with a lateral port 56 at an elevation slightly higher than the level of the fluid pool retained within the well. At the cup bottom is an eccentric opening communicating with an elongated spigot 57 which depends from the cup to deliver samples of fluid material through its open lower end. A closure for this spigot is also provided, the means shown being a resilient ball 58 carried at the lower end of a wire bail 59 having upper ends hooked into a pair of ears 60 which depend from the cup bottom. The spigot provides a guide into which is slidingly fitted the lower end portion of a vent tube 61 which extends upwardly within the cup to a point close to but short of its closure plate 48 (see Fig. 1). The normal longitudinal position of this vent tube is fixed by engagement of an annular shoulder 62, formed at the base of an enlarged outside diameter of tube walls in its upper end portion, with the cup bottom at the point where the spigot joins therewith; from this lowermost position the vent tube is free to rise to an upper position as will shortly be noted.

Formed in the vent tube walls is a pair oppositely disposed ports 65 whose lowest points are co-level with the interior of the cup bottom (see Figs. 1 and 2). These ports are in constant communication with the interior of the vent tube from that point down through its open bottom end. Just above these ports, in a plane at 90 degrees therefrom, is a second pair of openings in the vent tube through which is fitted a removable resilient plug 66 which closes off endwise communication through the tube at that point. A second pair of oppositely disposed ports 67, aligned with the first pair of ports 65, is formed through the vent tube walls at a point just above the plug 66. At the top of the vent tube 61 is a wide out-turned flange 68 directly below the orifice tube 55; this flange, when the vent tube is raised (see Fig. 2), establishes contact with the under side of the closure plate 48 thereby to substantially restrict communication at that point between the cup 45 and the orifice tube 55.

In practice, a sampler cup 45 having a capacity of about 10 ounces (by volume) is used. This is ample to meet all ordinary conditions of use in the dairy field. An extraordinary cow yield would be perhaps 60 lbs. of milk, but even so a cup capacity of around 10 ounces will suffice for the aliquot solution from such a milk yield. In the average case, the yield of milk would be much less, perhaps 24 lbs., and the aliquot solution diverted therefrom into the sampler cup would amount to about 4 ounces. From this amount all but one ounce or so which is reserved for test is returned to the conduit system without delay and without impairment of the vacuum conditions existing therein, all as will shortly be noted.

The two wells defined in the lower shell 16 of the housing H will alternately receive milk dumped from the two trays of the receiver R at the conclusion of each downward rocking movement. The discharge of milk is directed initially against the lower shell end walls which are rounded downwardly and inwardly, and from these points of delivery the milk runs down and into the wells to form pools therein. The fluid in these pools will remain co-level with the weirs 37 and 39, and any fluid in excess of their respective capacities will then flow over the weirs and drain out through the outlet nipple 19 into the conduit system. With each discharge of milk from the proximate tray of the receiver R against the rounded and inclined end wall of the lower shell 16 there is created a wave action which sweeps back across the surface of the pool toward the weir 37 or 39, as the case may be. Since the inlet port 56 in the orifice tube 55 is located just above the pool level and faced toward the oncoming waves, it stands to admit just the fluid which is elevated into the wave crests moving toward that port.

The area and height of this port are such as to admit only a predetermined amount of each moving wave of milk which then flows down into the collecting chamber, i.e., the cup 45, to accumulate into a volume of perhaps 4 or 5 ounces by the time the milking period ends. This predetermined amount of milk so extracted from that which is continuously moving through the conduit system is always consistent with the flow of the fluid by weight since each discharge of milk is also constant by weight. In this way a true proportionate sample of the milk, taken every few seconds during the entire milking operation, is obtained with assurance that it will very accurately represent the exact constituency of the full yield of milk from the producing source. Such an aliquot solution will reveal the true butter fat content, as well as other constituents present in the entire production, whether or not they may vary in ratio during various stages of the milking operation. The sequestration of the aliquot solution in the manner just described proceeds while the condition of minus pressure remains constant and undisturbed throughout the conduit system. During this period while extraction of samples proceeds, the milk pool behind the second weir 39 undergoes a similar wave disturbance, but is prevented by this weir acting as a baffle from affecting in any way the pool retained by the weir 37.

One further step remains to be taken, viz., returning into the conduit system all the accumulated milk in the collecting chamber save only a predetermined amount thereof that is to be reserved for test. This is done without impairing the vacuum existing in the conduit lines by swinging the ball valve 58 away from its closure position at the open lower end of the spigot 57 to admit air into the collecting chamber. The vent tube 61 will be impelled to rise in response to the pressure differential thus created, and in its up position the top flange 68 will abut the closure plate 48 to restrict communication between the conduit system and the collecting chamber 45. The ports 67 which communicate with the interior of the vent tube 61 remain open at all times. The air entering through the spigot 57 can advance only through the ports 65 into the body of the milk accumulated within the cup 45 and up therethrough to the top thereof. The milk so aerated is thereby stirred up and agitated to assure uniformity in its constituency at every point within its body. After passing upwardly through the milk body, the air fills the space thereabove to exert a downward pressure thereupon, thereby driving the milk out of the cup 45 through the ports 67 and orifice tubes 61 and 55 into the conduit system, all except that portion of the milk body which remains at the bottom of the collecting chamber and below the lowermost ports 65.

The ports 65 should be so located vertically as to retain in the cup 45 a predetermined amount of aliquot solution when the vent tube 61 is in up position. Regardless of the capacity of the cup, these ports should be at the elevation requisite for withdrawal of all milk in excess of the amount to be retained for test, 1 ounce, for example; by locating the ports 65 somewhat higher, milk samples aggregating a greater amount can be retained, if this should ever be desired. Having removed from the collecting chamber all fluid over and above that required for test, a milk valve 70 in the conduit system is closed, thereby allowing the milk claw to admit air thereinto whereby to produce a condition of atmospheric pressure therein. The vent tube 61 will thereupon drop to its lowermost position, shown in Fig. 1, permitting the aliquot solution reserved for test to drain out through the ports 65 and spigot 57 into a test tube or other receptacle. At this stage the ball valve 58 for the spigot is ready to be closed and the milk valve 70 to be opened, thereby conditioning the system and units therein for the next operation.

I claim:

1. A sampler mechanism for use with a conduit system wherein a fluid material is moved comprising means interposed in the system providing a pool of extended area into which a small quantity of the fluid material may be diverted for accumulation therein to a predetermined level, means for intermittently discharging fluid material on to the surface of the pool to produce a succession of waves moving thereacross, means for with-drawing from the pool fluid material comprising a downwardly extending tube having an inlet port slightly above the level of the pool in position to accept only the crest portions of the waves moving across the pool, and a collecting chamber wherein the extracted portions of the fluid material are accumulated prior to release therefrom of a predetermined amount thereof for test.

2. A sampler mechanism according to claim 1 wherein the conduit system is closed and means is provided to maintain therein a condition of minus pressure, means utilizing the minus pressure to transfer back into the conduit system some of the fluid material from the collecting chamber without disturbance of the minus pressure condition therein, and other means for gravity release of the balance of the fluid material remaining in the collecting chamber.

3. A sampler mechanism according to claim 1 wherein a second tube extends downwardly from the pool and is axially movable between two positions in one of which it affords the only means of communication whereby to evacuate fluid material in a predetermined amount from the collecting chamber back into the conduit system, the second tube when in its opposite position providing an outlet through the tube for accepting substantially all the fluid material remaining within the collecting chamber following evacuation of a predetermined amount thereof back into the conduit system, and a valved spigot controlling the final discharge of fluid material from the collecting chamber.

4. A sampler mechanism for use with a conduit system through which a stream of fluid material is moved comprising means interposed in the conduit system for retaining a quantity of the fluid material in a constant-level pool, means for intermittently diverting from the moving stream of fluid material successive small quantities thereof and discharging same upon the surface of the pool thereby to create a rhythmic wave action thereupon, take-off means exposed to the action of the waves upon the pool surface to remove therefrom portions of the crests thereof, and means providing a collecting chamber in communication with the take-off means for accumulating all the crest portions of the fluid material so removed.

5. A sampler mechanism according to claim 4 in which an axially movable tube is extended from a point directly below the take-off means downwardly into the collecting chamber and arranged to accept from the take-off means fluid material for gravity flow through the tube, the tube being provided also with an upper lateral port near the chamber bottom but elevated thereabove sufficiently to remain above the level of a predetermined quantity of fluid to be retained therein, and a lower lateral port co-level with the chamber bottom when the tube is in its down position, means closing communication within the tube between the two lateral ports thereof, and a valved opening at the lower end of the tube for controlling discharge therefrom of fluid material entering into the tube only through the lower lateral port thereof, the arrangement being such that fluid material is free to leave the chamber down to the level of the upper lateral port only when the tube is in upper position, the balance of the fluid material being then free to leave the chamber through the lower lateral port only when the tube is in down position.

6. A sampler mechanism according to claim 4 in which means is provided to move the fluid material through the conduit system in a continuously flowing stream, and in which the means for intermittently discharging small quantities of the fluid material upon the pool surface comprises a pivoted tray above the pool balanced to swing intermittently between up and down positions to accept successive loads of the fluid material each of which, when deposited therein, will cause the tray to swing to down position, thereby to discharge its load upon the surface of the pool.

7. A sampler mechanism according to claim 4 in which an elongated spigot in communication with the collecting chamber depends vertically from the bottom thereof, and in which a vertical tube is disposed within the collecting chamber with the tube bottom end portion slidingly fitted within the spigot to be supoprted thereby for limited vertical adjustment therein, the tube being provided with an inlet port near its top for acceptance of portions of oncoming wave crests on the pool surface for gravity flow through the tube, the tube being provided also with an upper lateral port near the chamber bottom but elevated thereabove sufficiently to remain above the level of a predetermined quantity of fluid to be retained therein, and a lower lateral port co-level with the chamber bottom when the tube is in its lowermost position, means closing communication within the tube between the two lateral ports thereof, the arrangement being such that fluid material is free to leave the chamber down to the level fo the upper lateral port only when the tube is in its uppermost position, the balance of the fluid material being then free to leave the chamber through the lower lateral port only when the tube is in its lowermost position.

8. In combination with a conduit system having an interposed housing through which a fluid material is moved, the housing being formed interiorly with a well wherein a constant level pool of fluid material is maintained, and exteriorly with a continuously-extending, downwardly-facing seat surrounding a chamber open at its bottom and closed at its top by a bottom wall of the housing through which is an orifice opening into the housing and into the well thereabove, a sampler mechanism comprising a cup open at its top, a closure plate fitted over the top of the cup in sealing engagement therewith, a tube fixedly carried by the closure plate to extend upwardly therefrom through the orifice of the housing wall and into the well thereabove, the tube being provided with an inlet port at a point slightly above the normal fluid level of the pool within the well to permit crests of fluid material waves moving across the pool to pass through the inlet port and downwardly into the cup to accumulate therein into an aliquot solution for test, means forming a seal between the closure plate and the downwardly facing seat to render fluid tight the chamber defined thereby whereby to retain therein any fluid material draining thereinto, and means for removably securing the cup to the housing and concurrently maintaining the closure plate in operative relation with both the seat thereabove and the cup top therebelow.

9. A housing according to claim 8 wherein means is provided to create a succession of waves moving across the surface of the pool, within the well toward the inlet port of the orifice tube.

10. A housing according to claim 8 wherein the means for removably securing the cup thereto comprises complementary, interengaging, relatively movable parts on the cup and housing respectively, one of the parts having an engaged face inclined slightly off of horizontal whereby to produce, when moved in a horizontal plane, relative vertical movement between the cup and housing with a consequent variable pressure upon the sealing means between the closure plate and its seat thereabove and the cup top therebelow.

References Cited in the file of this patent
UNITED STATES PATENTS

| | | |
|---|---|---|
| 1,146,402 | Chambers | July 13, 1915 |
| 1,571,201 | Jefferies | Feb. 2, 1926 |